Figure 1:
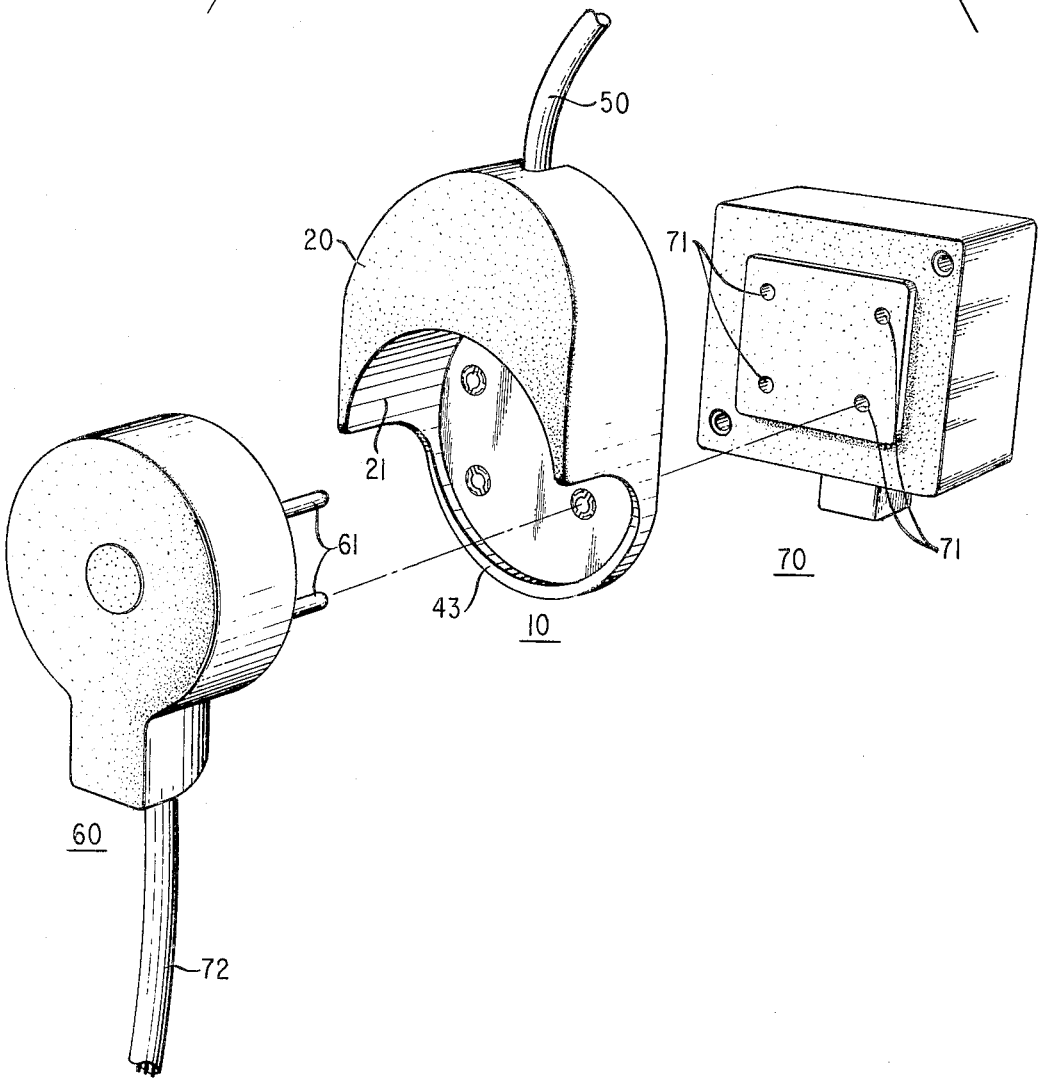
Figure 2:
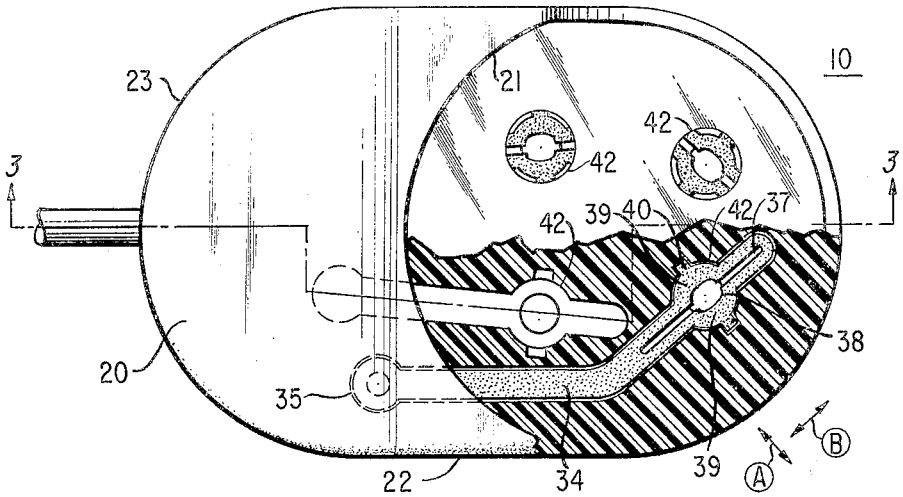
Figure 3:
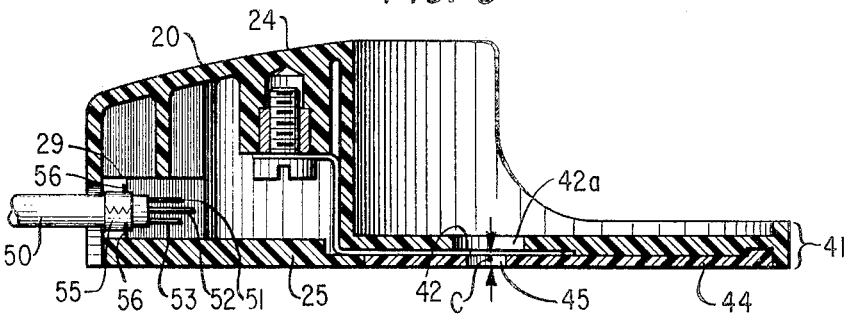
Figure 4:
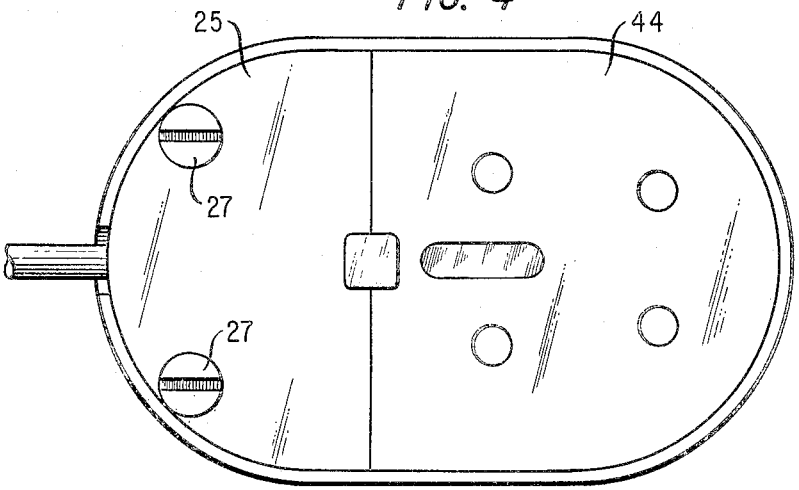
Figure 5:
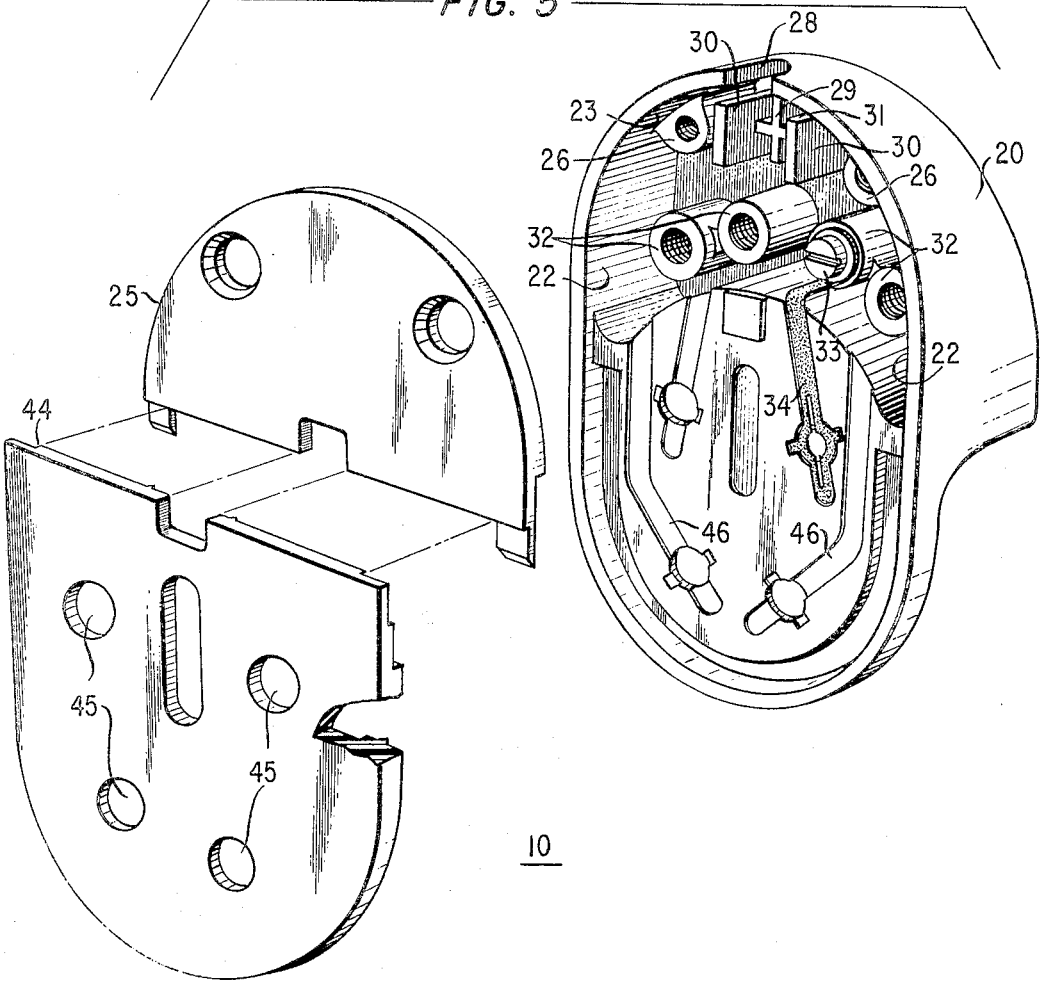
Figure 6:
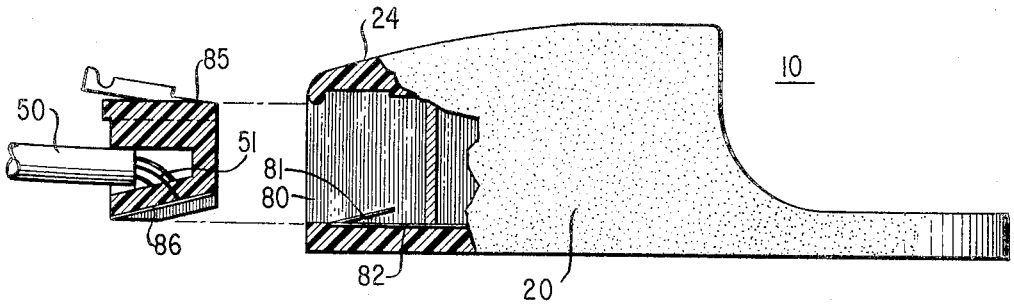

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 1, 1976

947 O.G. 13

T947,007

CONNECTOR BLOCK FOR BRIDGING BETWEEN A TELEPHONE WALL JACK AND PLUG

Charles Louis Krumreich and Robert Allen Spencer, Indianapolis, Ind., assignors to Bell Telephone Laboratories, Incorporated, Murray Hill, N.J.

Filed Jan. 23, 1975, Ser. No. 543,258
Int. Cl. H01r *31/00*
U.S. Cl. 339—154 A
3 Sheets Drawing. 7 Pages Specification

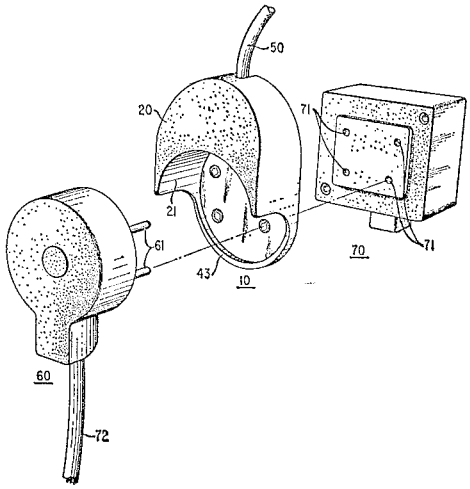

Connection of an auxiliary device to a telephone line at a customer's premises is easily and reliably made even by inexperienced personnel through a new adapter. The adapter consists basically of from two to four thin spring conductors mounted within a thin shelf and provided with oblong holes which accommodate around the prongs of a standard telephone plug. The plug then fits into a standard telephone wall jack, with more than sufficient penetration to assure adequate telephone connection.

CONNECTOR BLOCK FOR BRIDGING BETWEEN A TELEPHONE WALL JACK AND PLUG

Original Filed Jan. 23, 1975

CONNECTOR BLOCK FOR BRIDGING BETWEEN A TELEPHONE WALL JACK AND PLUG

Original Filed Jan. 23, 1975

CONNECTOR BLOCK FOR BRIDGING BETWEEN A TELEPHONE WALL JACK AND PLUG

Original Filed Jan. 23, 1975